United States Patent
Ito et al.

(10) Patent No.: US 7,279,204 B2
(45) Date of Patent: *Oct. 9, 2007

(54) HEAT-SHRINKABLE POLYESTER FILM

(75) Inventors: Hideki Ito, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/512,412

(22) PCT Filed: Apr. 23, 2003

(86) PCT No.: PCT/JP03/05139

§ 371 (c)(1),
(2), (4) Date: Oct. 25, 2004

(87) PCT Pub. No.: WO03/091004

PCT Pub. Date: Nov. 6, 2003

(65) Prior Publication Data

US 2006/0057346 A1    Mar. 16, 2006

(30) Foreign Application Priority Data

Apr. 24, 2002  (JP) .............................. 2002-122565

(51) Int. Cl.
B65B 53/00    (2006.01)
F16B 4/00     (2006.01)

(52) U.S. Cl. .................................. 428/34.9; 428/35.1
(58) Field of Classification Search ............... 428/34.9, 428/35.1
See application file for complete search history.

(56) References Cited

U.S. PATENT DOCUMENTS

| 5,534,570 | A |   | 7/1996  | Shih et al. |           |
|-----------|---|---|---------|-------------|-----------|
| 5,589,126 | A |   | 12/1996 | Shih et al. |           |
| 6,451,445 | B1|   | 9/2002  | Ito et al.  |           |
| 6,458,437 | B1| * | 10/2002 | Ito et al.  | 428/35.1  |
| 6,663,928 | B2| * | 12/2003 | Ito et al.  | 428/35.1  |

FOREIGN PATENT DOCUMENTS

| EP | 1024162 A2 | 8/2000 |
| EP | 1055506 A1 | 11/2000 |
| JP | 11263856   | 9/1999 |
| JP | 2002 046173 | 2/2002 |
| JP | 2000 135737 | 5/2000 |
| JP | 2000 167928 | 6/2000 |
| JP | 2000 169601 | 6/2000 |
| JP | 2000 169602 | 6/2000 |
| JP | 2000 327806 | 11/2000 |
| JP | 2001 205703 | 7/2001 |
| JP | 2002 046176 | 2/2002 |
| JP | 2002 046178 | 2/2002 |

OTHER PUBLICATIONS

Two-Page Summary of First Examination Report issued Feb. 10, 2006 in a corresponding Chinese Patent Application No. 03808340X, and its English translation.
Page 1 of examiner's remarks in First Examination Report issued Feb. 10, 2006 in the corresponding Chinese Patent Application No. 03808340X, and its English translation.
English Abstract JP 2000 167928, T. Tahoda, Publication Date Jun. 20, 2000.
English Abstract JP 2000 327806, H. Ito, Publication Date Nov. 28, 2000.
English Abstract JP 2001 205703, H. Ito, Publication Date Jul. 31, 2001.
English Abstract JP 2002 046173, S. Hayakawa, Publication Date Feb. 12, 2002.
English Abstract JP 2002 046176, H. Ito, Publication Date Feb. 12, 2002.
English Abstract JP 2000 135737, T. Tahoda, Publication Date May 16, 2000.
English Abstract JP 2000 169601, T. Tahoda, Publication Date Jun. 20, 2000.
English Abstract JP 2000 169602, T. Tahoda, Publication Date Jun. 20, 2000.
English Abstract JP 2002 046178, H. Ito, Publication Date Feb. 12, 2000.
English Abstract JP 11263856, M. Kosuge, Publication Date Sep. 28, 1999.

* cited by examiner

Primary Examiner—Nathan M. Nutter
(74) Attorney, Agent, or Firm—Kenyon & Kenyon LLP

(57) ABSTRACT

A heat-shrinkable polyester film characterized in that:
(A) the heat shrinkage percentages in the maximum shrinkage direction thereof is 10 to 50% in hot water at 70° C.;
(B) the heat shrinkage percentages in the maximum shrinkage direction thereof is 70% or more and that in the direction orthogonal to the maximum shrinkage direction is 10% or less in hot water at 85° C.; and
(C) when the heat shrinkage percentage in the maximum shrinkage direction in hot water at 95° C. is designated as $X_0$ (%) and the heat shrinkage percentage in the maximum shrinkage direction of a film obtained by previously heat-shrinking said film to an extent of 10% in hot water at 95° C. is designated as $X_{10}$ (%), the difference in heat shrinkage percentage $\Delta$ (%) calculated according to the following equation is 10 to 20%

$$\Delta = X_0 - X_{10}.$$

5 Claims, No Drawings

HEAT-SHRINKABLE POLYESTER FILM

This application is a 371 national phase application of PCT/JP03/05139 filed on 23 Apr. 2003, claiming priority to JP 2002-122565, filed on 24 Apr. 2002, the contents of which are incorporated herein by reference in their entireties.

TECHNICAL FIELD

The present invention relates to a heat-shrinkable polyester film suitable for label applications and a heat-shrinkable label using the same.

BACKGROUND ART

Heat-shrinkable plastic films are widely used in applications such as shrinkage packaging, shrink labels, and the like due to their characteristic property of shrinking by heat. Among them, polyvinyl chloride, polystyrene, polyester and other drawn films are used for packaging various containers made of materials such as polyethylene terephthalate (PET), polyethylene, glass, and as labels and cap seals or for the purpose of collective packaging.

However, polyvinyl chloride films have problems that they are low in heat resistance and generate hydrogen chloride gas and dioxins during incineration. In addition, the heat-shrinkable polyvinyl chloride resin film is used as shrink labels for PET containers or the like there is a problem that the PVC labels would be separated from the containers if the containers are to be recycled and reused.

Alternatively, polystyrene films are reasonably more favorable in label appearance after shrinkage but poorer in solvent resistance, and thus demand inks that contain special ingredients for printing. Additionally, polystyrene resins demand a higher temperature for incineration and have a problem of generating black smoke and foreign odor in greater amounts during incineration.

Having no such problems, polyester films are highly expected as shrink labels replacing the polyvinyl chloride and polystyrene films, and the amount of their consumption is gradually increasing in parallel with the expansion in the amount of PET containers used.

After production, these heat-shrinkable films are once wound in the form of roll; and then sent in such a form to a printing process wherein various drawings are printed thereon. If desired, these heat-shrinkable films are slit to a size suitable for use as labels for wrapping end-products after printing. These heat-shrinkable films are then converted into a tubular form by superimposing and sealing both ends of the films by means of, for example, solvent bonding and the like, and cut into the form of labels, bags or the like. The labels and bags thus obtained are loaded on containers, and then tightly bound to the containers by heat shrinkage, as the wrapped containers are passed on a belt conveyer or the like through a shrinkage tunnel (steam tunnel) wherein steam is applied for the heat shrinkage or in a shrinkage tunnel (hot-air tunnel) wherein heated air is applied for the heat shrinkage.

In the progressive move toward restriction of the use of colored PET bottles from the viewpoint of material recycling, there exists an increasing demand for larger labels of heat-shrinkable polyester films that can cover most of the sidewall of the bottles (so-called full labels) for the purpose of replacing the colored bottles. However, the sidewall shapes of the PET bottles vary significantly and accordingly the diameters of a PET bottle at particular heights vary significantly. Therefore, if a single label is used for wrapping a bottle, the extent of desirable label shrinkage varies depending on the specific position of the label wrapped around the bottle. Therefore, there exists a need for a heat-shrinkable polyester film having a shrinkage property superior to the conventional films and a potential of exhibiting an excellent label shrinkage property even when used for wrapping the bottles having an irregular sidewall shape.

For example in the production of PET-bottled drinks, loading and shrinkage of such labels is carried out more frequently in the drink filling line, for the purpose of improving productivity. Generally such filling lines are operated at high speed, thus demanding high-speed loading and shrinkage of the labels, i.e., shrinkage in a shorter period of time. As a result, in demand are heat-shrinkable polyester films that have the physical properties sufficient large for enduring the high-speed loading and the shrinkage property allowing higher shrinkage in a shortened period of time.

In addition, recently, labels for use in wrapping PET bottles and other various containers are required to have an additional function of reinforcing containers. However, the labels obtained from conventional heat-shrinkable polyester films could not provide such a reinforcing effect sufficiently.

The present invention is completed taking into account the situation above, and an object thereof is to provide a heat-shrinkable polyester film having a potential of exhibiting a favorable label shrinkage property even when used as a full label, and having an additional function of reinforcing the container loaded and shrunk therewith, and a heat-shrinkable label using the same.

DISCLOSURE OF THE INVENTION

Such an object has been achieved by a heat-shrinkable polyester film according to the present invention, which satisfies the following requirements, (A) to (C):

(A) when a square test piece cut off from the heat-shrinkable polyester film in a size of 10 cm×10 cm is immersed in hot water at 70° C. for 5 seconds, subsequently in water at 25° C. for 10 seconds, and withdrawn, the heat shrinkage percentage of the test piece in the maximum shrinkage direction is 10 to 50%;

(B) when a square test piece cut off from the heat-shrinkable polyester film in a size of 10 cm×10 cm is immersed in hot water at 85° C. for 5 seconds, subsequently in water at 25° C., for 10 seconds, and withdrawn, the heat shrinkage percentage of the test piece in the maximum shrinkage direction is 70% or more and that in the direction orthogonal thereto, 10% or less; and (C) when square test pieces cut off from the heat-shrinkable polyester film and the film thereof previously 10% heat-shrunk in the maximum shrinkage direction respectively in a size of 10 cm×10 cm are immersed in hot water at 95° C. for 5 seconds, subsequently in water at 25° C. for 10 seconds, and withdrawn, and the heat shrinkage percentages of the test pieces in the maximum shrinkage direction are designated respectively as $X_0$ (%) and $X_{10}$ (%), the difference $\Delta$ (%) between these values is 10 to 20%;

$$\Delta = X_0 - X_{10} \tag{1}$$

In addition, heat-shrinkable labels prepared from the heat-shrinkable polyester films are also included in the scope of the present invention.

DESCRIPTION OF THE PREFERRED EMBODIMENTS

The heat-shrinkable polyester film according to the present invention is prepared from a single copolyester having an ester unit constituted by one or more polybasic carboxylic acid components and one or more polyhydric alcohol components known in the art as the constitutional unit or a mixture of 2 or more polyesters.

In addition, the heat-shrinkable polyester film according to the present invention has heat shrinkage percentages, as determined under the conditions of (A) and (B) above, respectively of 10% or more and 50% or less (A); and 70% or more in the maximum shrinkage direction and 10% or less in the direction orthogonal to the maximum shrinkage direction (B). Such films provide heat-shrinkable labels that shrink at a high shrinkage percentage by treatment in a relatively shorter period of time.

In loading and shrinking the labels made of the heat-shrinkable film around containers, these containers are commonly conveyed and heated in a hot-air tunnel described above at a temperature of about 120 to 200° C. and a air flow rate of about 2 to 20 m/sec, or in a steam tunnel at a temperature of about 75 to 95° C. under steam of a pressure of about 0.5 to 20 MPa for about 2 to 20 seconds. The films satisfying the both requirements (A) and (B) in heat shrinkage percentage provide quite superior appearance after label shrinkage, even when they are used, for example, as the heat-shrinkable labels for wrapping PET containers having an irregular shaped side wall, or as the heat-shrinkable labels for the wrapping containers having the side wall that demands locally from the sidewall-wrapping labels a very high shrinkage percentage (e.g., when used as full labels for PET or glass bottles).

The heat-shrinkable labels having a heat shrinkage percentage smaller than 10%, as determined under condition (A), are not desirable as they are poorer in low temperature shrinkage property and demand higher temperature for shrinkage of the labels. On the other hand, the labels having a heat shrinkage percentage greater than 50%, as determined under condition (A), often lead to troubles such as dislocation of the labels due to heat shrinkage (upward migration due to drastic contraction of the films). The heat shrinkage percentage determined under condition (A) is preferably 15% to 40%.

The labels having a heat shrinkage percentage in the maximum shrinkage direction of smaller than 70%, as determined under condition (B), tend to cause insufficient shrinkage at the portions that demand greater shrinkage percentage (e.g., bottle neck portion and the like), for example, when the labels are wrapped and shrunk around PET bottles or the like. The heat shrinkage percentage in the maximum shrinkage direction is preferably 75% or more. In addition, the heat shrinkage percentage in the maximum shrinkage direction as determined under condition (B) is preferably 95% or less.

The labels having a heat shrinkage percentage in the direction orthogonal to the maximum shrinkage direction (orthogonal direction heat shrinkage percentage) of greater than 10%, as determined under condition (B), lead to troubles of improper appearance due to uneven shrinkage. The term, "uneven shrinkage", means that the length of labels become uneven after shrinkage, and such uneven shrinkage results in inadequate appearance of the labels, for example, that the upper edge of the labels becomes downward-curved or the lower edge thereof upward-curved after wrapped and shrunk around PET bottles or the like. The orthogonal direction heat shrinkage percentage determined under condition (B) is preferably 7% or less.

In addition, when the heat shrinkage percentage in the maximum shrinkage direction of a film before heat shrinkage (pre-shrinkage film), as determined under condition (C) above, is designated as $X_0$ (%) and the heat shrinkage percentage in the maximum shrinkage direction of the film that is obtained by previously 10% heat-shrinking the same pre-shrinkage film in the maximum shrinkage direction is designated as $X_{10}$ (%) as determined under condition (C) above, the heat-shrinkable polyester film according to the present invention has a difference in heat shrinkage percentage $\Delta$ (%) represented by the equation (1) above of 10% to 20%. Heat-shrinkable polyester films having the difference in heat shrinkage percentage $\Delta$ in the range above provide heat-shrinkable labels effective in reinforcing the wrapped containers.

The heat-shrinkable labels prepared from the heat-shrinkable polyester films having a difference in heat shrinkage percentage $\Delta$ smaller than the above range are not sufficiently high in reinforcing the containers after wrapping and shrinkage. Preferable difference in heat shrinkage percentage $\Delta$ of the heat-shrinkable polyester films according to the present invention is 17% or less. The lower limit of the difference in heat shrinkage percentage $\Delta$ is not lower than 10%, as the heat shrinkage percentage $X_{10}$ is a value determined by using films which were heat shrunk to an extent of 10%.

Incidentally, when common heat-shrinkable polyester films are additionally heat shrunk after they are once heat shrunk to an extent of 10%, the total heat shrinkage percentage (the sum of the first heat shrinkage percentage, 10%, and the second heat shrinkage percentage) is significantly lower than the heat shrinkage percentage of the pre-shrinkage films when they are shrunk completely under the same heat shrinkage condition (i.e., the difference in heat shrinkage percentage $\Delta$ above becomes greater than the above range determined under condition (C) for the films of the present invention). The films according to the present invention are provided with a difference in heat shrinkage percentage $\Delta$ controlled in the range above, by optimizing the compositions of the polyesters used for the films and controlling the film drawing conditions as will be described below.

Meanwhile, the "heat shrinkage percentage in the maximum shrinkage direction" means a heat shrinkage percentage in the direction wherein the test piece shrank to the greatest extent, and the maximum shrinkage direction and the direction orthogonal thereto are determined by the measured lengths in the machine direction and traverse direction of the square test piece. The heat shrinkage percentages (%) are determined by immersing a square test piece of 10 cm×10 cm in dimension in hot water at 70±0.5° C. under condition (A) and at 85±0.5° C. under condition (B), and the heat shrinkage percentage (%) $X_0$ by immersing a test sample of the preshrunk film in hot water at 95±0.5° C. under condition of (C), respectively under no load to allow the test pieces to shrink; immediately immersing the respective test pieces in water at 25±0.5° C. under no load for 10 seconds; then determining the length of the test pieces in one and the orthogonal direction; and calculating according to the following equation:

Heat shrinkage percentage=100×(Length before shrinkage−Length after shrinkage)÷(Length before shrinkage)

Alternatively, the heat shrinkage percentage $X_{10}$ to be used for calculation of the difference in heat shrinkage percentage Δ is determined by the following procedure.

First, a film that is previously heat shrunk in the maximum shrinkage direction to an extent of 10% is prepared. Also prepared is a frame having two chucks that hold only a pair of opposing edges of a rectangular film. A heat-shrinkable polyester film is cut along the maximum shrinkage direction into square or rectangular pieces. A film piece thus prepared is held by the frame. The film piece is loosely held in such a manner that both edges of the film in the maximum shrinkage direction are held by the chucks and the ratio of the length of the film piece between the chucks to the distance between chucks of the frame becomes 1:0.9. Subsequently, the film piece held in the frame is immersed in hot water at 95±0.5° C. under no load for 5 seconds allowing heat shrinkage, and immediately afterward immersed in water at 25±0.5° C. under no load for 10 seconds, and withdrawn. A film heat shrunk to an extent of 10% in the maximum shrinkage direction is obtained by removing the film from the frame and wiping water off the surface thereof.

A test piece of 10 cm×10 cm in dimension is cut off from the film thus obtained, and the heat shrinkage percentage $X_{10}$ is determined using the test piece according to the same method as that for determining the heat shrinkage percentage $X_0$ above, and the difference in heat shrinkage percentage Δ is calculated according to the above equation (1).

It is desirable to make, as short as possible, the periods between the steps for preparing the film heat shrunk to an extent of 10% in the maximum shrinkage direction and for cutting test pieces off and between the steps for cutting test pieces and for heat shrinking under condition (C). If the films previously heat shrunk to an extent of 10% in the maximum shrinkage direction are to be stored until the step for cutting test pieces, or if the cut test pieces are to be stored until the step for heat shrinkage, these films or test pieces should be placed under no tension in an environment of air at 25° C. or less, so that there is no undesirable heat shrinkage during storage.

In addition, with respect to the heat-shrinkable polyester film according to the present invention, the heat shrinkage stress of the film heat shrunk to an extent of 10% in the maximum shrinkage direction is preferably 7 MPa or more, when the heat shrinkage stress is determined under the condition of a temperature of 90° C. under heated air having a flow rate of 5 m/sec, a width of the test piece of 20 mm, and a distance between chucks of 100 mm. Films having a maximum heat shrinkage stress of 7 MPa or more provide heat-shrinkable labels more efficient in reinforcing the containers wrapped with the same labels. Specifically, heat-shrinkable labels prepared from the films having a maximum heat shrinkage stress smaller than the above range tend to be less effective in reinforcing the wrapped containers. The maximum heat shrinkage stress is more preferably 10 MPa or more, and still more preferably 11 MPa or more.

Here, the maximum value of the heat shrinkage stress is determined typically as follows.

[1] A test piece with a length of 200 mm in the maximum shrinkage direction and a width of 20 mm is cut off from a heat-shrinkable polyester film.

[2] A hot-air oven in a tensile tester fitted with the hot-air oven (e.g., Tensiron manufactured by Toyoseiki) is heated to 90° C. by supplying hot air.

[3] The hot air supply is terminated, and the test piece is placed in the heating oven. Distances between the two chucks facing each other are 100 mm (constant). The test piece is loosely held by the chucks so that the ratio of the length of the test piece to the distance between chucks becomes 1:0.9.

[4] After the door of the heating oven is immediately closed, and the supply of hot air is resumed (90° C., at a rate of 5 m/s). The test piece is allowed to heat shrink to an extent of 10%, and the heat shrinkage stress is measured after the heat shrinkage.

[5] The maximum value determined in the resulting chart was designated as the maximum heat shrinkage stress (MPa).

In addition, the heat-shrinkable polyester film according to the present invention is preferably more uniform in thickness, and when determined using a test piece of 50 cm in length and 5 cm in width, the thickness variation, as defined by the following equation (2), of the film in the maximum shrinkage direction is favorably 6% or less.

$$\text{Thickness distribution} = [(\text{maximum thickness} - \text{minimum thickness})/\text{average thickness}] \times 100 \quad (2)$$

The thickness distribution can be determined by preparing 10 test pieces 50 cm in length in the maximum shrinkage direction and 5 cm in width; measuring and recording on a chart the thickness of each test piece continuously in the length direction, using a contact thickness gauge (e.g., "KG60/A" manufactured by Anritsu Corp.); determining the maximum, minimum, and average thicknesses from the chart; calculating the thickness distribution according the above equation (2); and then calculating the average of the thickness distributions of the 10 test pieces.

Films having a thickness distribution of more than 6% often lead to poorer printability in printing process especially when multi-color images are printed, and errors in superposing images in multiple colors. In addition, such films make it difficult to superimpose the bonding portions of the films according to the present invention during processing thereof into tubular films by solvent bonding for production of labels. Further, the films having a thickness distribution of over 6% cause, when wound into a roll shape in the film production process, local differences of the hardness of the roll, which in turn cause looseness and crinkling of the films, sometimes making the films unsuitable for use as heat-shrinkable films. The thickness distribution above is more preferably 5% or less, particularly preferably 4% or less.

The melt resistivity of the heat-shrinkable polyester film according to the present invention at 275° C. is preferably $0.70 \times 10^8 \Omega \cdot cm$ or less. With such a low melt resistivity, the film may be brought into tighter electrostatic contact with casting roll, when the film melt-extruded from an extruder is cooled on the casting roll. The tighter electrostatic contact improves stability in cooling and solidifying films, consequently leading to increase in casting speed (production speed). The melt resistivity is preferably $0.65 \times 10^8 \Omega \cdot cm$ or less, more preferably $0.60 \times 10^8 \Omega \cdot cm$ or less.

Furthermore, low melt resistivity and high electrostatic contact combined allow increase in film quality. That is, low electrostatic contact may lead to inadequate cooling and solidification of films, which often results in local invasion of air between the film and the roll and generation of pin-like bubbles (filamentary defects), while high electrostatic contact can prevent generation of the pin-like bubbles and provide films more favorable in appearance.

Furthermore, sufficiently low melt resistivity and sufficiently high electrostatic contact combined provide films more uniform in thickness. When the electrostatic contact with the casting roll is inadequate, the cast undrawn films tend to have rather uneven thickness distribution, and the drawn films from the same undrawn films have an even greater fluctuation in thickness distribution. In contrast, when the electrostatic contact is sufficiently tight, the drawn films have more uniform thickness distribution.

In order to control the melt resistivity of a film in the range above, it is desirable to add both an alkali-earth metal compound and a phosphorus-containing compound to the film. Even though the presence of an alkali-earth metal compound alone is effective in reducing the melt resistivity, the presence of the phosphorus-containing compound together with the alkali-earth metal compound allows drastic reduction in melt resistivity. Though it is not exactly clear why the combined use of the alkali-earth metal and phosphorus-containing compounds is so effective in reducing the melt resistivity, it is likely that the presence of the phosphorus-containing compound leads to reduction in the amount of foreign materials and increase in the amount of electric charge carriers.

The content of the alkali-earth metal compound in the film is, for example, preferably 40 ppm (mass basis, same hereinafter) or more, more preferably 50 ppm or more, still more preferably 60 ppm or more, as alkali-earth metal atom, $M^2$. A smaller amount of the alkali-earth metal compound makes it more difficult to reduce the melt resistivity. Alternatively, the presence of the alkali-earth metal compound in an excessive amount leads to saturation of the advantageous effect of reducing melt resistivity and rather to disadvantages such as generation of foreign materials, discoloration, and the like. Therefore, the content of the alkali-earth metal compound is, for example, preferably 400 ppm or less, more preferably 350 ppm or less, still more preferably 300 ppm or less, as alkali-earth metal atom, $M^2$.

The content of the phosphorus compound in the film is, for example, preferably 10 ppm (mass basis, same hereinafter) or more, more preferably 15 ppm or more, still more preferably 20 ppm or more, as phosphorus atom, P. A smaller amount of the phosphorus compound does not allow reduction in melt resistivity and in the amount of foreign materials generated. On the contrary, the presence of an excessive amount of the phosphorus compound leads to saturation of the advantageous effect of reducing melt resistivity. Further, it also accelerates generation of diethylene glycol. As it is difficult to control the amount thereof generated, it may provide films having physical properties different from those expected. Accordingly, the content of the phosphorus compound is, for example, preferably 500 ppm or less, more preferably 450 ppm or less, still more preferably 400 ppm or less, as phosphorus atom, P.

When both an alkali-earth metal compound and a phosphorus compound are used for reducing the melt resistivity of the film, the mass ratio ($M^2/P$) of the alkali-earth metal atom $M^2$ to phosphorus atom P in the film is preferably 1.2 or more (more preferably 1.6 or more, particularly preferably 1.7 or more). The addition of these compounds at a mass ratio ($M^2/P$) of 1.5 or more allows significant reduction in melt resistivity of the resulting film. In contrast, the addition of these compounds at a mass ratio ($M^2/P$) of over 5.0 leads to increase in the amount of foreign materials generated and thus in discoloration of the resulting film. Therefore, the mass ratio ($M^2/P$) is favorably 5.0 or less, more preferably 4.5 or less, and still more preferably 4.0 or less.

It is desirable to add an alkali metal compound in addition to the alkali-earth metal and phosphorus-containing compounds to the film in order to reduce the melt resistivity further. The alkali metal compound cannot reduce the melt resistivity when added alone to the film, but can reduce significantly the melt resistivity when added to the film together with an alkali-earth metal compound and a phosphorus-containing compound. Although the reason is not clear, the alkali metal, alkali-earth metal, and phosphorus-containing compounds seem to form a complex, which reduces the melt resistivity.

The content of the alkali metal compound in the film is, for example, preferably 0 ppm (mass basis, same hereinafter) or more, more preferably 5 ppm or more, still more preferably 6 ppm or more, particularly preferably 7 ppm (mass basis) or more, as alkali metal atom $M^1$. Presence of an excessive amount of the alkali metal compound leads to saturation of the advantageous effect of reducing the melt resistivity and to increase in the amount of foreign materials generated. Therefore, the content of the alkali metal compound is, for example, preferably 100 ppm (mass basis) or less, more preferably 90 ppm (mass basis) or less, and still more preferably 80 ppm (mass basis) or less, as alkali metal atom $M^1$.

Examples of the alkali-earth metal compound include hydroxides, alkoxides, aliphatic carboxylates (acetate, butyrate, etc., preferably acetate), aromatic carboxylates (benzoate), salts of compounds having phenolic hydroxyl groups (salts of phenol and the like), and the like of alkali-earth metals. The alkali-earth metals include magnesium, calcium, strontium, barium, and the like (preferably magnesium). Preferred examples of the alkali-earth metal compounds include magnesium hydroxide, magnesium methoxide, magnesium acetate, calcium acetate, strontium acetate, barium acetate, and the like, and particularly preferably is magnesium acetate. The alkali-earth metal compounds may be used alone or in combination of two or more.

Examples of the phosphorus compounds include phosphoric acids (phosphoric acid, phosphorous acid, hypophosphorous acid, and the like) and the esters thereof (alkyl esters, aryl esters, and the like); and alkylphosphonic acids, arylphosphonic acids and the esters thereof (alkyl esters, aryl esters, and the like). Preferred examples of the phosphorus compounds include phosphoric acid; phosphoric aliphatic esters (phosphoric alkyl esters; e.g., phosphoric mono $C_{1-6}$ alkyl esters such as monomethyl phosphate, monoethyl phosphate, monobutyl phosphate, and the like; phosphoric di $C_{1-6}$ alkyl esters such as dimethyl phosphate, diethyl phosphate, dibutyl phosphate, and the like; phosphoric tri $C_{1-6}$ alkyl esters such as trimethyl phosphate, triethyl phosphate, tributyl phosphate, and the like); phosphoric aromatic esters (phosphoric mono-, di- or tri-$C_{6-9}$ aryl esters such as triphenyl phosphate and tricresyl phosphate, and the like); phosphorous aliphatic esters (phosphorous alkyl esters; e.g., phosphorous mono-, di- or tri-$C_{1-6}$ alkyl esters such as trimethyl phosphite, tributyl phosphite, and the like); alkyl phosphonic acids ($C_{1-6}$ alkylphosphonic acids such as methylphosphonic acid, ethylphosphonic acid, and the like); alkylphosphonic alkyl esters ($C_{1-6}$ alkylphosphonic mono- or di-$C_{1-6}$ alkyl esters such as dimethyl methylphosphonate, dimethyl ethylphosphonate, and the like); arylphosphonic alkyl esters ($C_{6-9}$ arylphosphonic mono- or di-$C_{1-6}$ alkyl esters such as dimethyl phenylphosphonate, diethyl phenylphosphonate, and the like); and arylphosphonic aryl esters ($C_{6-9}$ arylphosphonic mono- or di-$C_{6-9}$ aryl esters such as diphenyl phenylphosphonate, and the like). Particularly preferable examples of the phosphorus compounds include phosphoric acid and trialkyl phosphates (trimethyl phosphate and the like). These phosphorus compounds may be used alone or in combination of two or more.

Examples of the alkali metal compounds include hydroxides, carbonates, aliphatic carboxylates (acetates, butyrates and the like, preferably acetates), aromatic carboxylates (benzoates), salts of compounds having phenolic hydroxyl groups (salts of phenol, and the like) of alkali metals. The alkali metals include lithium, sodium, potassium, and the like (preferably sodium). Preferred examples of the alkali metal compounds include lithium hydroxide, sodium hydroxide, potassium hydroxide, lithium carbonate, sodium carbonate, potassium carbonate, lithium acetate, sodium acetate, potassium acetate, and the like, and particularly preferable is sodium acetate.

The heat-shrinkable polyester film according to the present invention has an ester unit comprising a polybasic carboxylic acid component and a polyhydric alcohol component as the main constitutional unit.

The polybasic carboxylic acids constituting the polybasic carboxylic acid component of the ester unit include aromatic dicarboxylic acids such as terephthalic acid, isophthalic acid, naphthalenedicarboxylic acid, orthophthalic acid and the like; aliphatic dicarboxylic acids such as adipic acid, azelaic acid, sebacic acid, decanedicarboxylic acid, and the like; alicyclic dicarboxylic acids; and the ester derivatives thereof.

When an aliphatic dicarboxylic acid described above is used, the content of the aliphatic dicarboxylic acid component is preferably less than 3 mole % with respect to 100 mole % of polybasic carboxylic acid components of the film. As described in detail below, ethylene terephthalate unit is preferably used as the main constitutional unit for the heat-shrinkable polyester film according to the present invention, for the purpose of improving breaking resistance, mechanical strength, heat resistance and the like. Accordingly, the terephthalic acid component is favorably the major portion of the polybasic carboxylic acid component in the film. If a film contains 3 mole % or more aliphatic dicarboxylic acid component, such a film may not provide heat-shrinkable labels having the high stiffness (toughness) that allows high-speed loading of the labels onto containers.

In addition, it is preferably not to use a tribasic or higher-basic polybasic carboxylic acid (e.g., trimellitic acid, pyromellitic acid, or the like, or the anhydride thereof). The heat-shrinkable polyester films containing one or more polybasic carboxylic acid components sometimes do not provide sufficiently high heat shrinkage percentage.

For the purpose of forming the ethylene terephthalate unit, ethylene glycol is used as the polyhydric alcohol for the polyhydric alcohol component in the ester unit. Additionally, aliphatic diols such as propylene glycol, 1,4-butanediol, 1,6-hexanediol, 3-methyl-1,5-pentanediol, neopentylglycol, 2-methyl-1,5-pentanediol, 2,2-diethyl-1,3-propanediol and the like; alicyclic diols such as 1,4-cyclohexanone dimethanol and the like; and alkylene oxide adducts of dimer diol, bisphenol compounds or the derivatives thereof may be used together.

For the film according to the present invention, a polyester having a glass transition temperature (Tg) adjusted to 60 to 75° C. by using one or more diols having 3 to 6 carbon atoms (e.g., propylene glycol, 1,4-butanediol, neopentylglycol, 1,6-hexanediol, or the like) or 1,4-cyclohexanone dimethanol is favorably used.

In particular, use of a polyester partially employing neopentylglycol is favorable from the viewpoint of ensuring the increase in heat shrinkage percentage, appearance after label shrinkage, and container-reinforcing effect. The content of the neopentylglycol component is favorably 15 mole % or more, preferably 18 mole % or more, and 27 mole % or less, preferably 25 mole % or less with respect to 100 mole % polyhydric alcohol components in the film. Alternatively, if a diol having 3 to 6 carbon atoms other than neopentylglycol is used, the content of the diol component is favorable 3 mole % or more, preferably 5 mole % or more, and 15 mole % or less, preferably 13 mole % or less with respect to 100 mole % polyhydric alcohol components in the film. If 1,4-cyclohexanone dimethanol is used, the content of the 1,4-cyclohexanone dimethanol component is recommended to be 15 mole % or more, preferably 18 mole % or more, and 27 mole % or less, preferably 25 mole % or less with respect to 100 mole % polyhydric alcohol components in the film.

In addition, it is preferable not to use a diol having 8 or more carbon atoms (e.g., octanediol or the like) other than the polyhydric alcohols indicated above as favorable or a trihydric or higher-hydric polyhydric alcohol. Heat-shrinkable polyester films containing these diol components or polyhydric alcohol components may not have sufficiently high heat shrinkage percentage.

Although not mentioned as the polyhydric alcohols, lactones exemplified by ε-caprolactone may be used partly. By ring opening, the lactones provide a unit having ester bonds at both ends.

Considering the breaking resistance, mechanical strength, heat resistance, and others of the films, the ethylene terephthalate unit is preferably present therein in an amount of 50 mole % or more with respect to 100 mole % constitutional units in the heat-shrinkable polyester film. Therefore, the content of the terephthalic acid component (component of containing terephthalic acid or the ester) is preferably 50 mole % or more with respect to 100 mole % polybasic carboxylic acid components, and the content of the ethylene glycol component, 50 mole % or more with respect to 100 mole % polyhydric alcohol components. The content of the ethylene terephthalate unit is more preferably 55 mole % or more, and still more preferably 60 mole % or more.

The polyester constituting the heat-shrinkable polyester film can be prepared according to any common melt-polymerization methods, including the so-called direct polymerization method, i.e., polycondensation of oligomers obtained by a direct reaction of a polybasic carboxylic acid component and a polyhydric alcohol component, and the so-called ester exchange method, i.e., ester exchange reaction of a polybasic carboxylic acid dimethyester component and a polyhydric alcohol component and subsequent polycondensation, any method including above may be applicable. The polyester may be obtained by other polymerization processes. The degree of polymerization of the polyester is preferably 0.3 to 1.3 dl/g as intrinsic viscosity.

Polymerization catalysts used for the polymerization reaction include various catalysts conventionally used: for example, titanium-based catalysts, antimony-based catalysts, germanium-based catalysts, tin-based catalysts, cobalt-based catalysts, manganese-based catalysts, and the like. Preferable catalysts include titanium-based catalysts (titanium tetrabutoxide and the like), antimony-based catalysts (antimony trioxide and the like), germanium-based catalysts (germanium dioxide and the like), cobalt-based catalysts (cobalt acetate and the like), and the like.

The alkali metal, alkali-earth metal, and/or phosphorus-containing compounds may be added at any time and in any step, i.e., before esterification reacting, during esterification, during the period between esterification and polymerization, during polymerization, or after polymerization, preferably in any one of the steps after esterification, and more preferably in the steps after esterification and before the start of polymerization process. Addition of an alkali-earth metal compound and/or a phosphorus-containing compound (and an alkali metal compound if desired) after the esterification process allows reduction in the amount of foreign materials generated compared to the addition thereof before the process.

In addition, a fine particle, such as silica, titanium dioxide, kaolin, calcium carbonate or the like, may be added to the raw material of a film if desired, and further an antioxidant, UV absorbent, antistatic agent, coloring agent, antibacterial agent, or the like may be also added.

Polyester films may be produced by any one of the methods known in the art as described below. The methods for producing heat-shrinkable polyester films containing multiple components include those of using a single copolyester prepared by copolymerization of these multiple components and of blending different kinds of homopolyesters or copolyesters.

In the single copolyester method above, a copolyester prepared from a certain composition of polyhydric alcohols and a certain composition of polybasic carboxylic acids may be used. Alternatively, the method of blending multiple homo- or co-polyesters having different compositions is more favorably employed, as it allows modification of the properties of films only by changing the blending ratios and thus is more suitable for commercial production of a variety of films.

More specifically, it is preferable in the blending method to use and blend two or more kinds of polyesters having different Tg's. Three or more kinds of polyesters may be used for blending.

Although blending of two or more kinds of polyesters may raise concern about troubles, such as whitening of films and the like, due to the incompatibility of these polyesters with each other, the multiple polyesters contained in films are usually converted to a single homogeneous copolyester by the ester-exchange reaction caused by the heat in film extrusion process described below, and thus the troubles, such as the whitening and the like above, are known to be avoided. The copolymerization in the ester-exchange reaction can be confirmed, for example, by the fact that the Tg of a film, which is obtained from the blend of two or more kinds of polyesters having different Tg's, has a single Tg as determined by a known method.

In a typical example of the process of producing the films, raw polyester chips are dried in a dryer, such as a hopper drier, paddle drier, vacuum dryer, or the like, and extruded into a film by an extruder at a temperature of 200 to 300° C. Alternatively, undried polyester raw chips may be extruded into a film in the similar manner while water therein is being removed in a vent-type extruder. For extrusion, any one of the various conventional methods, such as the T die, tubular, and other methods, may be employed. After extrusion, the extruded film is preferably cooled rapidly to give an undrawn film. Such undrawn films include films that are partially drawn for conveying the films in the production process.

The films according to the present invention may be films having a single layer or multi-layered films having 2 or more layers (e.g., 2, 3, 4, or more layers). If a multi-layered film is desirable, polyesters having the same composition may be used for the layers in the multi-layered film, or polyesters having different compositions may be used separately for each layer of the multi-layered film. For three-layered films, it is also recommended to use a polyester having the same composition for the outer two layers and another polyester having a different composition for the inner layer. The methods of lamination in producing these multi-layered films are not particularly restricted, but, for example, the coextrusion method or the like known in the art may be used for preparing the undrawn films above.

As described above, for the purpose of improving the uniformity in film thickness, it is recommended to place an electrode between the extruder and the casting roll and apply a voltage between the electrode and the casting roll for bringing the film into tighter contact with the casting roll electrostatically.

The undrawn film is then subjected to a drawing treatment. The undrawn films may be drawn continuously after cooling with the casting roll, or may be once wound in the form of roll and then drawn. Hereinafter, drawing for production of the films having the traverse direction thereof as the maximum shrinkage direction will be described as an example, as it is more practical from a view point of the production efficiency that the maximum shrinkage direction is the traverse (width) direction of the films. However, it is also possible to draw the undrawn film to give a film having the maximum shrinkage of the film, according to common methods, for example, by changing the drawing direction for an angle of 90°.

For the purpose of controlling the thickness distribution of the resulting heat-shrinkable polyester films in the range not more than the upper limit value above, the film is preferably heated in a preliminary heating process before it is drawn in the traverse direction for example by a tenter in the drawing process. In the preliminary heating process, the film is preferably heated by supplying heating gas at such a low flow rate that the coefficient of heat transfer becomes not larger than 0.00544 J/cm$^2$·sec·° C. (0.0013 calorie/cm$^2$·sec·° C.), until the film surface reaches a temperature in the range of Tg+0° C. to Tg+60° C.

The film is then drawn in the traverse direction at a predetermined temperature in the range of Tg−5° C. to Tg+15° C. For controlling the heat shrinkage percentages, (A) and (B), and the difference in heat shrinkage percentage Δ of the films according to the present invention in the range described above and additionally the maximum heat shrinkage stress thereof in the range above, the drawing may be conducted in two steps or more. Hereinafter, 2-step drawing will be described as an example.

First, the films are subjected to the first drawing. The drawing ratio is 4.4 times to 6.0 times, preferably 4.8 times to 5.5 times with respect to the undrawn film. The first drawing temperature is the temperature described above (a certain temperature in the range of Tg−5° C. to Tg+15° C.).

Subsequently, the film is preferably heat-treated (heat-set) while slightly tensioned in the drawing direction. The tension ratio is recommended to be 1% to 6%, preferably 2% to 5% with respect to the film after first drawing. The heat-set temperature is preferably the same as the first drawing temperature, or in the temperature range described above but about 1 to 5° C. lower than the first drawing temperature; and the heat-set period is 0.5 second to 5 seconds, preferably 1 second to 3 seconds.

Subsequently, the films are subjected to the second drawing. The drawing ratio is 1.1 times to 1.5 times (preferably 1.3 times or less) with respect to the film after the heat setting (or after first drawing if no heat setting is provided). The second drawing temperature is preferably the same as the heat-set temperature above or in the temperature range above but about 1 to 5° C. lower than the heat-set temperature.

The drawn films are then cooled, preferably while slightly tensioned, to give heat-shrinkable polyester films. The tension ratio during the cooling is preferably 0.1 to 3% with respect to the film after second drawing.

If the film is drawn in three steps, the heat-set process is preferably placed between the second and the third drawing processes. The conditions for the heat-set process may be determined in the similar manner to the heat set conditions above. In addition, the conditions for the third drawing may also be determined in the similar manner to the second drawing condition above.

The number of drawing steps is preferably larger, from the viewpoint of controlling the heat shrinkage percentage of films. As too many steps make it more difficult to design such drawing facilities for commercial production, the number of the drawing steps is 6 or less, preferably 4 or less.

In the traverse drawing process, it is preferable to use a facility that allows smaller fluctuation in film surface temperature. Drawing processes include preliminary heating process before drawing, drawing process, heat-treating process after drawing, relaxation process, redrawing process, and the like. In particular, in the preliminary heating process, the drawing process, and the heat-treating process after drawing, variation in surface temperature as determined at any points of the film is preferably in the range of an average temperature±1° C., more preferably of the average temperature±0.5° C. It is because smaller the variation in the surface temperature of film allows drawing and heat treatment at the same temperature over the entire range of the film, and consequently production of films more uniform in physical properties such as heat shrinkage property and others.

The films may be drawn uniaxially not only in the traverse direction by a tenter but also in the machine direction to an extent of 1.0 to 4.0 times, preferably 1.1 to 2.0 times. In such biaxial drawing, the film may be processed either by sequential or simultaneous biaxial drawing, and additionally redrawn if desired. In the sequential biaxial drawing, the order of drawing is also not particularly limited, and thus the films may be drawn in the machine and then traverse directions; in the traverse and then machine directions; in the machine, traverse and machine directions; traverse, machine and traverse directions; or in other ways. If the films are drawn uniaxially in the machine-direction drawing or biaxially, it is preferable, in the similar manner to the traverse drawing, to reduce the variations in the film surface temperature as much as possible during the processing in the preliminary heating, drawing, and other processes.

Such facilities for reducing the fluctuation in film surface temperature include, for example, a facility equipped with an inverter for controlling the flow rate of the heated air for heating the film and thus suppressing the fluctuation in flow rate; a facility suppressing the temperature fluctuation of heated air by using as the heat source a low pressure steam having a pressure of 500 kPa or less (5 kgf/cm² or less); and the like.

For the purpose of suppressing the internal heat evolution due to film drawing and minimizing the variation in temperature of the films in the width direction, the coefficient of heat transfer during the drawing process is preferably 0.00377 J/cm²·sec·° C. (0.0009 calorie/cm²·sec·° C.) or more, and more preferably 0.00544 to 0.00837 J/cm²·sec·° C. (0.0013 to 0.0020 calorie/cm²·sec·° C.).

The thickness of the heat-shrinkable polyester films according to the present invention is not particularly limited, but the thickness of the heat-shrinkable films for labels, for example, is preferably 10 to 100 μm, more preferably 20 to 60 μm.

The heat-shrinkable labels obtained from the heat-shrinkable polyester films according to the present invention provide favorable appearance after label shrinkage when used as the full labels (labels demanding high shrinkage percentage locally) for PET bottles and others. In addition, such labels shrink at high shrinkage percentage in a shorter period of time. Further, they also have an effect of reinforcing the containers wrapped and shrunk with them, such as PET bottles or the like.

For converting the heat-shrinkable polyester films to heat-shrinkable labels, for example, the heat-shrinkable films before shrinkage are stored under an environment wherein the temperature and humidity are controlled for a certain period; and an adhesion solvent is applied on the films with a certain width at the position slightly inward from the edge of one face of the films and the resulting films are immediately folded superposing the edges of the films and bonded into tubes, using a tube forming apparatus known in the art. The tubes thus prepared are then cut to a predetermined length, giving the heat-shrinkable labels of the present invention.

Alternatively, a melt bonding method, wherein part of the film is melted, may also be used for bonding the film, but it is preferable to bond the film by the solvent bonding method, from the viewpoints of suppressing the fluctuation in heat shrinkage property of the labels. Examples of such solvents usable are organic solvents including aromatic hydrocarbons such as benzene, toluene, xylene, trimethyl benzenes and the like; halogenated hydrocarbons such as methylene chloride, chloroform, and the like; phenols such as phenol and the like; furans such as tetrahydrofuran and the like; and oxolanes such as 1,3-dioxolane and others. Among them, 1,3-dioxolane is preferable, as it is safer.

The heat-shrinkable labels above are loaded onto containers such as PET bottles and the like, and shrunk and wrapped around the containers by the heat shrinkage means known in the art described above (hot-air tunnel, steam tunnel, etc.).

PET bottles wrapped and shrunk with the heat-shrinkable labels of the present invention, even if the bottles are for example about 30% lighter than the conventional PET bottles, are reinforced therewith to such an extent that they may be handled in a manner similar to that of the conventional PET bottle, for example, during transportation or sales. For reinforcement of PET bottles, it is preferable for a label to cover 75% or more of the sidewall of a PET bottle.

The labels prepared from the heat-shrinkable films of the present invention in the following manner exhibit an excellent container-reinforcing effect. For example, a percentage change in diameter of the bottle wrapped and shrunk with such a label as determined by the method described below is preferably 10% or less, and more preferably 7% or less.

1,3-Dioxolane is coated on one side of the film with a width of 2±1 mm (width) at a position slightly inward from an edge thereof (coating amount: 3.0±0.3 g/mm²). After the edges of the film are superimposed and bonded, the tubular film formed is cut into cylindrical labels 14 cm in length and 6.7 cm in diameter. The cylindrical label is loaded on a 500-mL cylindrical PET bottle [height: 21 cm, mid-section (trunk section) diameter 6.5 cm] having a weight of 20.5 g, which was previously added with 500 mL of water and sealed, and the label is shrunk as the bottle is passed through a steam tunnel at a zone temperature 85° C. for 2.5 seconds. The diameter of the mid-section ($W_1$) of the label-wrapped bottle thus obtained is determined under a load of 15 kg in a compression mode using the "Strograph V10-C" manufactured by Toyoseiki, and the percentage change in bottle diameter (%) is calculated according to the following equation:

Percentage change in bottle diameter (%)=100×($W_1$-$W_2$)/$W_2$

Herein, $W_2$ represents the diameter of the mid-section bottle before the load is applied.

Labels having a percentage change in bottle diameter of over 10% are unfavorable, as the containers wrapped with such labels tend to deform and sometimes cause clogging or other problems, for example, when the wrapped containers are dropped in automatic dispenser.

EXAMPLE

Hereinafter, the present invention will be described in more detail with reference to EXAMPLES, but it should be understood that the present invention is not restricted by the following EXAMPLES and any modification or use of the present invention in the context thereof is also included in the scope of the present invention. In the following EXAMPLES, the unit "ppm" used is a mass-based unit. The physical properties of the films obtained in EXAMPLES and COMPARATIVE EXAMPLES were determined by the following methods:

(1) Heat Shrinkage Percentage

A film was cut into a 10 cm×10 cm square test piece. The test piece was immersed into hot water under no load at temperatures of the following (A), (B) and (C) for 5 seconds allowing the test piece to heat shrink, and then into water at a temperature of 25±0.5° C. for 10 minutes. Subsequently, the length and the width of the resulting test piece were determined and the heat shrinkage percentage was calculated according to the following equation.

Heat shrinkage percentage (%)=100×(Length before shrinkage−Length after shrinkage)÷(Length before shrinkage)

Herein, the temperature (A) is 75±0.5° C.; (B), 85±0.5° C.; and (C), 95±0.5° C. The direction having the largest shrinkage percentage was designated as the maximum shrinkage direction.

(2) Difference in Heat Shrinkage Percentage

There prepared was a frame having two chucks facing each other in such a manner that the chucks hold a pair of opposite ends of a rectangular film. A heat-shrinkable polyester film was cut along the maximum shrinkage direction into square or rectangular pieces. The cut film was held by the above frame. At that time, the film was loosely held at both ends thereof in the maximum shrinkage direction, by adjusting the ratio of the film length to the distance between the chucks at 1:0.9. Subsequently, the film held by the frame was immersed in hot water at 95±0.5° C. under no load for 5 seconds allowing heat shrinkage and immediately after then in water at 25±0.5° C. under no load for 10 seconds, and withdrawn. The film was removed from the frame and wiped to remove residual water, to give a film heat-shrunk to an extent of 10% in the maximum shrinkage direction. Then, the film was placed under no tension under an atmospheric environment at 25° C. or less, and provided to the following process as soon as possible.

The film was cut into 10 cm×10 cm square test pieces. The test piece was immersed in hot water at 95±0.5° C. under no load for 5 seconds allowing heat shrinkage and then in water 25±0.5° C. for 10 seconds, and withdrawn. The lengths of the test piece in the longitudinal and traverse directions were determined, and the heat shrinkage percentage thereof in the maximum shrinkage direction $X_{10}$ was calculated according to the equation described above for calculation of the heat shrinkage percentage. The heat shrinkage percentage in the maximum shrinkage direction obtained under the condition of (1-C) above was designated as $X_0$. The difference in heat shrinkage percentage Δ (%) was calculated from these values according to the above equation (1).

(3) Maximum Heat Shrinkage Stress

The maximum heat shrinkage stress is determined by a tensile tester fitted with a hot-air oven (Tensiron manufactured by Toyoseiki). A test piece having a length in the maximum shrinkage direction of 200 mm and a width of 20 mm is cut from a film before heat shrinkage. After hot air supply into the tensile tester for raising the temperature thereof to 90° C. is terminated in advance, a test piece is loosely connected to a pair of chucks having a distance of 100 mm, in such a manner that the ratio of the test piece length to the actual distance between the chucks becomes 1:0.9. After the door of the heating oven was immediately closed and the supply of hot air (90° C., at a rate of 5 m/s) was resumed from the back, left, and right direction of the oven, the heat shrinkage stress of the test piece is measured. The maximum heat shrinkage stress (MPa) after 10% shrinkage is determined from the measurement chart.

(4) Thickness Distribution

Ten test pieces having a length of 50 cm in the maximum shrinkage direction of film and a width of 5 cm were prepared. The thickness of each test piece in the length direction was determined and recorded on a chart continuously using a contact thickness gauge (e.g., "KG60/A" manufactured by Anritsu Corp., or the equivalents). The maximum, minimum, and average thicknesses were determined from the chart, and the thickness distribution was calculated according to the above equation (2). In the similar manner, the thickness distributions of the 10 test pieces were determined, and the average thereof was designated as the thickness distribution of the film.

(5) Melt Resistivity

A pair of electrodes was inserted into a test piece (film) melted at a temperature of 275° C., and a voltage of 120 V was applied between the electrodes. The resultant electric current was determined, and the melt resistivity (Si; unit: Ω·cm) was calculated according to the following equation.

$Si=(A/I)\times(V/io)$

[wherein, A represents the surface area of the electrodes ($cm^2$); I, the distance between the electrodes (cm); V, the voltage (V); and io, the electric current (A).]

(6) Label Shrinkage Property

A film was printed in advance with three-color inks, grass green, gold, and white, manufactured by Toyo Ink Mfg., and stored under an environment controlled to a temperature of 30±1° C. and a relative humidity of 85±2% for 250 hours. 1,3-dioxolane is applied in a width of 2±1 mm at a position slightly inward from one edge of the film (coating amount: 3.0±0.3 g/$mm^2$), and the resulting film is bonded immediately at the both ends into a tubular film using a tube forming apparatus, which is then folded flat and wound. The tubular film is then cut into cylindrical labels having a height of 14 cm and a diameter of 6.7 cm. The labels are loaded on 500-mL cylindrical PET bottles filled with water [having a height of 21 cm and a mid-section (trunk section) diameter 6.5 cm], and heated, allowing the film to shrink, by conveying the bottles (n=20) in a steam tunnel (SH-1500-L manufactured by Fuji Astec) under the condition of a tunnel-passing time of 2.5 seconds and a zone temperature of 85° C. label. The resulting label shrinkage was examined by visual inspection, and the label shrinkage properties are classified into the following two groups: ◯: Absence of crinkling, surface unevenness, or insufficient shrinkage; and x: Presence of crinkling, surface unevenness, or insufficient shrinkage.

(7) Container-Reinforcing Effect 1,3-dioxolane is applied in a width of 2±1 mm at a position slightly inward from one edge of a film (coating amount: 3.0±0.3 g/mm$^2$), and the resulting film is bonded immediately at the both ends into a tubular film using a tube forming apparatus, which is then folded flat and wound. The tubular film is then cut into cylindrical labels having a height of 14 cm and a diameter of 6.7 cm. Cylindrical PET bottles having a capacity of 500 mL and a weight of 20.5 g [height: 21 cm; mid-section (trunk section) diameter: 6.5 cm] are filled with 500 mL of water and sealed closely, and then the resulting bottles are wrapped with the cylindrical labels above, which are then heated for shrinkage by conveying the bottles in a steam tunnel (SH-1500-L manufactured by Fuji Astec) under the condition of a tunnel-passing time of 2.5 seconds and a zone temperature of 85° C.

The diameter at the central portion of the label-wrapped bottle thus obtained ($W_1$) was determined while a load of 15 kg is applied to the mid-section sidewall of the bottle, using the "Strograph V10-C" manufactured by Toyoseiki in the compression mode. The percentage change in bottle diameter (%) is calculated according to the following equation:

Percentage change in bottle diameter (%)=100×($W_1$−$W_2$)$W_2$ wherein, $W_2$ represents a diameter at the central portion of the bottle before applying the load.

Preparative Example 1

Dimethyl terephthalate (100 mole %) and ethylene glycol (100 mole %) in an amount of 2.2 times (mole ratio) larger than that of the polybasic carboxylic acid were added into an esterification reactor respectively as the polybasic carboxylic acid and the polyhydric alcohol. Additionally, antimony trioxide in an amount of 0.04 mole % with respect to the polybasic carboxylic acid and magnesium acetate tetrahydrate in an amount of 81 ppm as Mg atom with respect to the polyester were added at the same time. The resulting mixture was heated to 230° C. while stirring, allowing ester-exchange reaction to proceed for 120 minutes under normal pressure. The ester-exchange reaction was terminated when a predetermined amount of methanol is distilled off. After the ester-exchange reaction, trimethyl phosphate was added to the polyester in an amount of 58 ppm as P atom with respect to the polyester, and the mixture was heated to 280° C. under reduced pressure over a period of 85 minutes, and additionally heated at the same temperature allowing polycondensation to proceed for about 40 minutes until the melt viscosity reaches 7,000 poise, giving polyester A.

Preparative Examples 2 to 7

Polyesters B to G shown in Table 1 were prepared in the similar manner to PREPARATIVE EXAMPLE 1. In PREPARATIVE EXAMPLES 2 and 3, antimony trioxide was used as the polymerization catalyst in an amount of 160 ppm as Sb atom with respect to polyester, giving polyesters B and C. Alternatively, in PREPARATIVE EXAMPLE 4, titanium tetrabutoxide was used as the polymerization catalyst in an amount of 90 ppm as Ti atom with respect to the polyester, giving polyester D. Further, in PREPARATIVE EXAMPLE 6, cobalt acetate tetrahydrate was used as the polymerization catalyst in an amount of 20 ppm as Co atom with respect to the polyester, and additionally titanium tetrabutoxide, in an amount of 15 ppm as Ti atom with respect to the polyester, giving polyester F. In PREPARATIVE EXAMPLE 7, the polymerization catalyst was the same as that in PREPARATIVE EXAMPLE 1.

Polyesters A to G obtained in PREPARATIVE EXAMPLES 1 to 7 above are summarized in Table 1. In Table 1, DMT represents dimethyl terephthalate; DMN, dimethyl naphthalate; EG, ethylene glycol; NPG, neopentylglycol; BD, 1,4-butanediol; CHDM, 1,4-cyclohexanone dimethanol; and PPG, propanediol.

TABLE 1

| | Polymerization composition | | | | | | |
|---|---|---|---|---|---|---|---|
| | Polybasic carboxylic acid (mole %) | | Polyhydric alcohol (mole %) | | | | |
| Polyester | DMT | DMN | EG | NPG | BD | CHDM | PPG |
| A | 100 | — | 100 | — | — | — | — |
| B | 100 | — | 60 | 40 | — | — | — |
| C | 100 | — | 70 | 30 | — | — | — |
| D | 100 | — | — | — | 100 | — | — |
| E | — | 100 | 100 | — | — | — | — |
| F | 100 | — | 70 | — | — | 30 | — |
| G | 100 | — | — | — | — | — | 100 |

Example 1

Chips of Polyester A (15 mass %), polyester chip B (75 mass %) and chips of Polyester D (10 mass %), which were separately dried in advance, were blended, and the blend was melt-extruded (through a T dye) at a temperature of 280° C. using a uniaxial extruder and chilled on a casting roll to give an undrawn film having a thickness of 260 μm. The undrawn film was preheated at 100° C. for 3 seconds, and then drawn in the traverse direction (film width direction) using a tenter. The film was first drawn 4.75 times at 77° C. (first drawing), then tensioned at 77° C. for 5 seconds (heat setting) to an extent of 3% in the film width direction with respect to the film obtained in the first drawing step, and then redrawn at 75° C. to an extent of 1.1 times with respect to the film width after the heat setting (second drawing). The film after the second drawing step was then cooled allowing tension of 1% with respect to the film width after the second drawing, to give polyester film No. 1 having a thickness of 50 μm. The properties of the film obtained are summarized in Table 4.

Example 2

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, to give polyester film No. 2 having a thickness of 50 μm. The properties of the film obtained are summarized in Table 4.

Example 3

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 3 having a thickness of 50 μm. The properties of the film obtained are summarized in Table 4.

Example 4

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 4 having a thickness of 50 μm. The properties of the film obtained are summarized in Table 4.

Example 5

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 5 having a thickness of 50 μm. The properties of the film obtained are summarized in Table 4.

Example 6

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 6 having a thickness of 50 μm. The properties of the film obtained are summarized in Table 4.

Example 7

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 7 having a thickness of 50 μm. The properties of the film obtained are summarized in Table 4.

Example 8

A tri-layered polyester film No. 8 consisting of two outer layers and an internal layer was prepared. For the internal layer, 15 mass % polyester A, 75 mass % polyester C, and 10 mass % polyester D chips, which were separately dried in advance, were blended and used. For the outer layers, 15 mass % polyester A and 85 mass % polyester F chips, which were separately dried in advance, were blended and used. These polyester chip mixtures were co-extruded through a T die using a uniaxial extruder at 280° C., and the resulting film was chilled on a casting roll to give an undrawn film in a tri-layer structure consisting of outer layers having a thickness of 65 μm respectively, and an inner layer having a thickness of 130 μm. The undrawn film was then drawn in the similar manner to EXAMPLE 1, except that the drawing was conducted under the condition shown in Table 3, to give multi-layered polyester film No. 8 having a thickness of 50 μm (consisting of two outer layer having a thickness of 12.5 μm respectively and an inner layer having a thickness of 25 μm). The properties of the film obtained are summarized in Table 4.

Example 9

An undrawn film having a thickness of 260 μm was obtained in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 9 having a thickness of 50 μm. The properties of the film obtained are summarized in Table 4.

Example 10

An undrawn film having a thickness of 200 μm was prepared in the similar manner to EXAMPLE 1, except that the blending composition of the polyester chips was changed to that shown in Table 2. The undrawn film was drawn in the similar manner to EXAMPLE 1, except that the drawing condition was changed to that shown in Table 3, to give polyester film No. 10 having a thickness of 50 μm. The properties of the film obtained are summarized in Table 4.

TABLE 2

| | Layer construction | | Polyester blending composition (mass %) | | | | | | |
|---|---|---|---|---|---|---|---|---|---|
| | | | A | B | C | D | E | F | G |
| Film No. 1 | Monolayer | | 15 | 75 | — | 10 | — | — | — |
| Film No. 2 | Monolayer | | 10 | 80 | — | 10 | — | — | — |
| Film No. 3 | Monolayer | | 15 | 80 | — | 5 | — | — | — |
| Film No. 4 | Monolayer | | 15 | — | 75 | 10 | — | — | — |
| Film No. 5 | Monolayer | | — | — | — | — | 15 | 85 | — |
| Film No. 6 | Monolayer | | 15 | — | — | — | — | 85 | — |
| Film No. 7 | Monolayer | | 15 | — | 75 | — | — | — | 10 |
| Film No. 8 | Tri-layer | Inner layer | 15 | — | 75 | 10 | — | — | — |
| | | Outer layer | 15 | — | — | — | — | 85 | — |
| Film No. 9 | Monolayer | | 40 | — | 50 | 10 | — | — | — |
| Film No. 10 | Monolayer | | 15 | 75 | — | 10 | — | — | — |

TABLE 3

| | First drawing | | Heat setting | | | Second drawing | | Tension ratio during cooling (%) |
|---|---|---|---|---|---|---|---|---|
| | Drawing ratio (times) | Temperature (° C.) | Tension ratio (%) | Temperature (° C.) | Period (sec.) | Drawing ratio (times) | Temperature (° C.) | |
| Film No. 1 | 4.75 | 77 | 3 | 77 | 5 | 1.1 | 75 | 1 |
| Film No. 2 | 4.75 | 77 | 3 | 77 | 5 | 1.1 | 75 | 1 |
| Film No. 3 | 4.75 | 80 | 3 | 80 | 5 | 1.1 | 78 | 1 |
| Film No. 4 | 4.75 | 78 | 0 | — | — | 1.1 | 78 | 0 |
| Film No. 5 | 4.75 | 95 | 3 | — | — | 1.1 | 75 | 1 |
| Film No. 6 | 4.75 | 80 | 3 | — | — | 1.1 | 75 | 1 |
| Film No. 7 | 4.75 | 77 | 3 | — | — | 1.1 | 75 | 1 |
| Film No. 8 | 4.75 | 78 | 3 | — | — | 1.1 | 75 | 1 |
| Film No. 9 | 4.75 | 84 | 0 | — | — | 1.1 | 77 | 0 |
| Film No. 10 | 3.64 | 78 | 0 | — | — | 1.1 | 78 | 0 |

In Table 3, the drawing ratio during the first drawing is a ratio with respect to the film width; the tension ratio during the heat setting is a ratio with respect to the film width after the first drawing; the drawing ratio during the second drawing is a ratio with respect to the film width after heat setting (or after the first drawing if heat setting is not conducted); and the tension ratio during cooling is a ratio with respect to the film width after second drawing. With respect to films Nos. 4, 9 and 10, a tension ratio of "0%" during heat setting represents that heat setting process is not available, and a tension ratio of "0%" during cooling represents that the film was cooled under no tension after the second drawing.

TABLE 4

| | Heat shrinkage percentage (%) | | Difference in heat shrinkage percentage Δ (%) | Maximum heat shrinkage stress (MPa) | Label shrinkage property | Thickness distribution (%) | Melt resistivity ($\times 10^8$ Ω · cm) | Percentage change in bottle diameter (%) |
|---|---|---|---|---|---|---|---|---|
| | (A) | (B) | | | | | | |
| | | Maximum shrinkage direction | Orthogonal direction | | | | | |
| Film No. 1 | 30 | 78 | −1 | 10 | 12 | ○ | 0.8 | 0.32 | 6.0 |
| Film No. 2 | 43 | 78 | −3 | 11 | 12 | ○ | 0.9 | 0.27 | 6.1 |
| Film No. 3 | 48 | 78 | −3 | 11 | 14 | ○ | 0.7 | 0.31 | 5.9 |
| Film No. 4 | 30 | 78 | −1 | 22 | 8 | ○ | 1.3 | 0.32 | 6.7 |
| Film No. 5 | 15 | 76 | 2 | 15 | 10 | ○ | 1.0 | 0.65 | 6.5 |
| Film No. 6 | 13 | 76 | −1 | 16 | 14 | ○ | 0.9 | 0.31 | 5.9 |
| Film No. 7 | 42 | 77 | 1 | 11 | 11 | ○ | 1.1 | 0.41 | 6.3 |
| Film No. 8 | 45 | 78 | 0 | 10 | 12 | ○ | 1.0 | 0.32 | 6.0 |
| Film No. 9 | 20 | 70 | 1 | 30 | 5 | X | 2.0 | 0.55 | 8.0 |
| Film No. 10 | 17 | 74 | 8 | 26 | 6 | X | 2.5 | 0.32 | 9.0 |

INDUSTRIAL APPLICABILITY

As described above, the heat-shrinkable polyester film according to the present invention provides labels for wrapping containers that retain beautiful appearance after heat shrinkage, as the labels allow heat shrinkage in a relatively lower range of temperature even when the labels should be shrunk locally at higher shrinkage percentage. Additionally, the heat-shrinkable labels prepared from the heat-shrinkable polyester film according to the present invention are excellent in reinforcing the wrapped containers.

Accordingly, the heat-shrinkable polyester film and label according to the present invention are suitable for production of various wrapping labels, including full labels for PET bottles and the like.

What is claimed is:

1. A heat shrinkable polyester film, which satisfies the following requirements, (A) to (C):
    (A) when a square test piece cut off from said heat-shrinkable polyester film in a size of 10 cm×10 cm is immersed in hot water at 70° C. for 5 seconds, subsequently in water at 25° C. for 10 seconds, and withdrawn, the heat shrinkage percentage of the test piece in the maximum shrinkage direction is 10 to 50%;
    (B) when a square test piece cut off from the heat-shrinkable polyester film in a size of 10 cm×10 cm is immersed in hot water at 85° C. for 5 seconds, subsequently in water at 25° C. for 10 seconds, and withdrawn, the heat shrinkage percentage of the test piece in the maximum shrinkage direction is 70% or more and that in the direction orthogonal thereto, 10% or less; and
    (C) when a square test pieces cut off from the heat-shrinkable polyester film and the film thereof previously 10% heat shrunk in the maximum shrinkage direction in a size of 10 cm×10 cm are immersed in hot water at 95° C. for 5 seconds, subsequently in water at 25° C. for 10 seconds, and withdrawn, the heat shrinkage percentage of the test pieces in the maximum shrinkage direction are designated respectively as $X_0$ (%) and $X_{10}$ (%), the difference in heat shrinkage percentage Δ (%) calculated according to the following equation is 10 to 20%, $$\Delta = X_0 - X_{10}.$$

2. A heat shrinkable polyester film according to claim 1, wherein when the heat shrinkage stress in the maximum shrinkage direction of the film thereof previously 10% heat-shrunk in the same direction is determined under the condition of a temperature of 90° C., a flow rate of heated air of 5 m/sec, a width of the test piece of 20 mm, and a distance between chucks of 100 mm, the maximum heat shrinkage stress is 7 MPa or more.

3. A heat shrinkable polyester film according to claim 1, wherein when a thickness variation of a test piece thereof having a length of 50 cm and a width of 5 cm is determined in the maximum shrinkage direction of the film, the thickness distribution calculated according to the following equation is 6% or less, $$\text{Thickness distribution} = [(\text{Maximum thickness} - \text{Minimum thickness})/\text{Average thickness}] \times 100.$$

4. A heat shrinkable polyester film according to claim 1, wherein the melt resistivity thereof is $0.70 \times 10^8 \, \Omega \cdot \text{cm}$ or less at 275° C.

5. A heat-shrinkable label comprising said heat-shrinkable polyester film according to claim 1.

* * * * *

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

On the title page, item [57]:

Abstract, line 2, change "percentages" to --percentage--.

Abstract, line 4, change "percentages" to --percentage--.

Column 1, line 27, change "In addition, the" to --In addition, when the--.

Column 1, line 28, change "film is" to --films are--.

Column 1, line 67, change "accordingly" to --accordingly,--.

Column 2, line 1, change "a PET bottle" to --the PET bottles--.

Column 2, line 13, change "Generally" to --Generally,--.

Column 2, line 17, change "sufficient" to --sufficiently--.

Column 3, line 22, change "a air flow" to --an air flow--.

Column 3, line 26, change "the both" to --both--.

Column 3, line 38, change "property" to --properties--.

Column 3, line 38, change "temperature" to --temperatures--.

Column 3, line 63, change "become" to --becomes--.

Column 4, line 59, change "of (C)," to --(C),--.

Column 5, line 17, change "afterward" to --afterwards--.

Column 6, line 30, change "according the" to --according to the--.

Column 6, line 55, change "increase" to --increases--.

Column 6, line 59, change "increase" to --increases--.

UNITED STATES PATENT AND TRADEMARK OFFICE
CERTIFICATE OF CORRECTION

PATENT NO.         : 7,279,204 B2
APPLICATION NO. : 10/512412
DATED                 : October 9, 2007
INVENTOR(S)       : Hideki Ito et al.

It is certified that error appears in the above-identified patent and that said Letters Patent is hereby corrected as shown below:

Column 7, line 20, change "increase" to --increases--.

Column 7, line 61, change "increase" to --increases--.

Column 8, line 18, change "increase" to --increases--.

Column 8, line 35, change "preferably is" to --preferably,--.

Column 9, line 42, change "preferably" to --preferable--.

Column 9, line 47, change "percentage" to --percentages--.

Column 10, line 27, change "and others" to --and other properties--.

Column 10, line 31, change "(component of" to --(component--.

Column 11, line 2, change "polymerization process" to --the polymerization process--.

Column 11, line 38, change "in film" to --in the film--.

Column 12, line 15, change "of roll" to --of a roll--.

Column 13, line 25, change "any points of the film" to --any point of the film--.

Column 13, line 26, change "more preferably of the" to --more preferably an--.

Column 14, line 64, change "85 C°" to --of 85 C°--.

Column 15, line 13, change "dispenser" to --dispensers--.

Column 16, line 25, change "direction" to --directions--.

Column 16, line 39, change "in the similar" to --in a similar--.

Column 16, line 64, change "the both" to --both--.

Column 17, line 3, change "6.5 cm" to --of 6.5 cm--.

UNITED STATES PATENT AND TRADEMARK OFFICE
CERTIFICATE OF CORRECTION

| | |
|---|---|
| PATENT NO. | : 7,279,204 B2 |
| APPLICATION NO. | : 10/512412 |
| DATED | : October 9, 2007 |
| INVENTOR(S) | : Hideki Ito et al. |

It is certified that error appears in the above-identified patent and that said Letters Patent is hereby corrected as shown below:

Column 17, line 19, change "the both" to --both--.

Column 17, lines 39-40, change "$100\times(W1-W2)W2$" to --$100\times(W1-W2)/W2$--.

Column 18, lines 3-4, change "the similar" to --a similar--.

Column 19, line 4, change "the similar" to --a similar--.

Column 19, line 15, change "the similar" to --a similar--.

Column 19, line 27, change "the similar" to --a similar--.

Column 19, line 29, change "the similar" to --a similar--.

Column 19, line 38, change "the similar" to --a similar--.

Column 19, line 40, change "the similar" to --a similar--.

Column 19, line 50, change "the similar" to --a similar--.

Column 19, line 52, change "the similar" to --a similar--.

Column 19, line 62, change "the similar" to --a similar--.

Column 19, line 64, change "the similar" to --a similar--.

Column 20, line 18, change "the similar" to --a similar--.

Column 20, line 30, change "the similar" to --a similar--.

Column 20, line 32, change "the similar" to --a similar--.

Column 20, line 43, change "the similar" to --a similar--.

Column 20, line 45, change "the similar" to --a similar--.

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

Column 21, line 30, change "films Nos." to --film Nos.--.

Column 21, line 31, change "that heat" to --that the heat--.

Column 21, line 61, change "retain" to --retain a--.

In Claim 1, line 15, change "thereto," to --thereto is--.

In Claim 1, line 17, change "test pieces" to --test piece--.

In Claim 4, line 2, change "$10^8$ n · cm" to --$10^8$ Ω· cm--.

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

On the title page, item [57]:

Abstract, line 2, change "percentages" to --percentage--.

Abstract, line 4, change "percentages" to --percentage--.

Column 1, line 27, change "In addition, the" to --In addition, when the--.

Column 1, line 28, change "film is" to --films are--.

Column 1, line 67, change "accordingly" to --accordingly,--.

Column 2, line 1, change "a PET bottle" to --the PET bottles--.

Column 2, line 13, change "Generally" to --Generally,--.

Column 2, line 17, change "sufficient" to --sufficiently--.

Column 3, line 22, change "a air flow" to --an air flow--.

Column 3, line 26, change "the both" to --both--.

Column 3, line 38, change "property" to --properties--.

Column 3, line 38, change "temperature" to --temperatures--.

Column 3, line 63, change "become" to --becomes--.

Column 4, line 59, change "of (C)," to --(C),--.

Column 5, line 17, change "afterward" to --afterwards--.

Column 6, line 30, change "according the" to --according to the--.

Column 6, line 55, change "increase" to --increases--.

Column 6, line 59, change "increase" to --increases--.

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

Column 7, line 20, change "increase" to --increases--.

Column 7, line 61, change "increase" to --increases--.

Column 8, line 18, change "increase" to --increases--.

Column 8, line 35, change "preferably is" to --preferably,--.

Column 9, line 42, change "preferably" to --preferable--.

Column 9, line 47, change "percentage" to --percentages--.

Column 10, line 27, change "and others" to --and other properties--.

Column 10, line 31, change "(component of" to --(component--.

Column 11, line 2, change "polymerization process" to --the polymerization process--.

Column 11, line 38, change "in film" to --in the film--.

Column 12, line 15, change "of roll" to --of a roll--.

Column 13, line 25, change "any points of the film" to --any point of the film--.

Column 13, line 26, change "more preferably of the" to --more preferably an--.

Column 14, line 64, change "85 C°" to --of 85 C°--.

Column 15, line 13, change "dispenser" to --dispensers--.

Column 16, line 25, change "direction" to --directions--.

Column 16, line 39, change "in the similar" to --in a similar--.

Column 16, line 64, change "the both" to --both--.

Column 17, line 3, change "6.5 cm" to --of 6.5 cm--.

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

Column 17, line 19, change "the both" to --both--.

Column 17, lines 39-40, change "$100 \times (W1-W2)W2$" to --$100 \times (W1-W2)/W2$--.

Column 18, lines 3-4, change "the similar" to --a similar--.

Column 19, line 4, change "the similar" to --a similar--.

Column 19, line 15, change "the similar" to --a similar--.

Column 19, line 27, change "the similar" to --a similar--.

Column 19, line 29, change "the similar" to --a similar--.

Column 19, line 38, change "the similar" to --a similar--.

Column 19, line 40, change "the similar" to --a similar--.

Column 19, line 50, change "the similar" to --a similar--.

Column 19, line 52, change "the similar" to --a similar--.

Column 19, line 62, change "the similar" to --a similar--.

Column 19, line 64, change "the similar" to --a similar--.

Column 20, line 18, change "the similar" to --a similar--.

Column 20, line 30, change "the similar" to --a similar--.

Column 20, line 32, change "the similar" to --a similar--.

Column 20, line 43, change "the similar" to --a similar--.

Column 20, line 45, change "the similar" to --a similar--.

UNITED STATES PATENT AND TRADEMARK OFFICE
CERTIFICATE OF CORRECTION

PATENT NO. : 7,279,204 B2
APPLICATION NO. : 10/512412
DATED : October 9, 2007
INVENTOR(S) : Hideki Ito et al.

It is certified that error appears in the above-identified patent and that said Letters Patent is hereby corrected as shown below:

Column 21, line 30, change "films Nos." to --film Nos.--.

Column 21, line 31, change "that heat" to --that the heat--.

Column 21, line 61, change "retain" to --retain a--.

Column 22, In Claim 1, line 63, change "thereto," to --thereto is--.

Column 22, In Claim 1, line 65, change "test pieces" to --test piece--.

Column 24, In Claim 4, line 12, change "$10^8$ n · cm" to --$10^8$ Ω· cm--.

This certificate supersedes the Certificate of Correction issued August 26, 2008.

Signed and Sealed this

Twenty-third Day of September, 2008

JON W. DUDAS
*Director of the United States Patent and Trademark Office*